United States Patent [19]

Tsujimoto

[11] 3,866,240
[45] Feb. 11, 1975

[54] EXPOSURE CORRECTION CIRCUITRY FOR PHOTOGRAPHIC CAMERAS MEASURING LIGHT RAYS THROUGH AN OBJECTIVE LENS

[75] Inventor: Kayoshi Tsujimoto, Osaka, Japan

[73] Assignee: Minolta Camera Co., Ltd., Osaka-fu, Japan

[22] Filed: Aug. 6, 1971

[21] Appl. No.: 169,637

[30] Foreign Application Priority Data
Aug. 12, 1970 Japan................................. 45-70531

[52] U.S. Cl....................... 354/24, 354/51, 354/60, 354/152
[51] Int. Cl............................ G03b 7/08, G01j 1/44
[58] Field of Search ........ 95/10 CT, 53 EB; 354/24, 354/48, 49, 50, 51, 60, 152

[56] References Cited
UNITED STATES PATENTS

| | | | |
|---|---|---|---|
| 3,324,779 | 6/1967 | Nobusawa et al. ...................... | 95/42 |
| 3,442,190 | 5/1969 | Erickson ........................... | 95/10 CT |
| 3,470,798 | 10/1969 | Miyakawa .......................... | 95/10 CT |
| 3,533,348 | 10/1970 | Yanagi .............................. | 95/10 CT |

FOREIGN PATENTS OR APPLICATIONS

| | | | |
|---|---|---|---|
| 398,295 | 2/1966 | Switzerland......................... | 356/219 |
| 1,212,590 | 11/1970 | Great Britain...................... | 95/10 CT |

*Primary Examiner*—Joseph F. Peters, Jr.
*Attorney, Agent, or Firm*—Watson, Cole, Grindle & Watson

[57] ABSTRACT

An automatic exposure control device for a single lens reflex camera includes a correction circuit for generating current in accordance with the intensity of light incident on a photosensitive element which is unrelated to scene light. The light measuring circuit includes a capacitor for storing a voltage representative of the scene light and an integrating capacitor which is charged by a current proportional to the light intensity incident on the photosensitive element. When the photosensitive element is blocked from the scene light as the photograph is taken, the correction circuit generates a current in accordance with the stray light.

11 Claims, 3 Drawing Figures

INVENTOR
KAYOSHI TSUJIMOTO

BY *Watson, Cole, Grindle & Watson*
ATTORNEY

3,866,240

EXPOSURE CORRECTION CIRCUITRY FOR PHOTOGRAPHIC CAMERAS MEASURING LIGHT RAYS THROUGH AN OBJECTIVE LENS

BACKGROUND OF THE INVENTION

The present invention relates to a photographic camera having a photosensitive element for measuring light rays through the objective lens, and more particularly to a camera having such a photosensitive element in the finder light path, which eliminates photometric errors brought about by light rays coming from eyepiece of the finder and enables the exposure control to be effected on the basis of the correct photometry.

It is well known that cameras for measuring light ray through the objective lens have various advantages.

In the case where such a photosensitive element is mounted in a camera, locating it in the photographic light path is not desirable because the shadow of the photosensitive element falls on the picture to be photographed, and as a result in a single lens reflex camera it has been proposed to dispose it in the light path where light rays through the objective lens are reflected by a movable reflector.

However, since for that light path the eyepiece is always opened that the camera is set for observing the picture image or set for exposure, therefore, external leakage light rays coming from the eyepiece are incident upon the photosensitive element. Both in normal observation and in the subsequent exposure the eyepiece is covered by the naked eye of the photographer and light rays leaking out of the eyepiece are very little. However, when the photographer has on spectacles the leakage light rays become greater and further when carrying out a self-timed photograph the finder eyelens is thoroughly opened to the outside field and the incident light rays thereupon increase remarkably.

That is, mounting a photosensitive element in the finder light path means that the photosensitive element receives light rays coming into the finder from the eye piece and a photometric error results to cause an error in the exposure control.

OBJECTS OF THE INVENTION

One object of the present invention is to provide a photographic camera having a photosensitive element for measuring light rays through the objective lens as described above, which eliminates photometric errors and accordingly exposure control errors owing to the external light rays coming from the eyepiece.

Another object of the present invention is to provide a photographic camera of the type specified, which, compensates for errors generated by light rays coming from the eyepiece of the finder by means of a correction circuit in the exposure control circuit.

Another object of the present invention is to provide a photographic camera so constructed that the output of the photosensitive element effected by light rays coming from the eyepiece of the finder is detected in the course of exposure control of the camera. In the exposure control circuit controlled by a stored voltage in accordance with the output of the photosensitive element effected by the lightness of an object and light rays incident upon the photosensitive element from the eyepiece of the finder measured prior to the exposure of the camera, the correction circuit compensates errors generated by the leakage light rays coming from the eyelens of the finder.

Other objects and advantages of the present invention will be apparent from the following description.

SUMMARY OF THE INVENTION

In order to attain the objects mentioned above, the present invention relates to a photographic camera having a photosensitive element for measuring light rays through the objective lens, which is characterized in that the device for storing the photometric value which is measured by the photometric circuit including a photosensitive element prior to exposure, and the exposure control circuit for controlling the shutter speed on the basis of the stored value are provided with a bypass for the timer condenser therof. The electric current flowing through the bypass is controlled by the output of the photosensitive element in the course of exposure of the camera to compensate the output corresponding to the light rays incident upon the photosensitive element coming from the eyepiece of the finder.

Further, when the movable mirror the camera shuts off the photographic chamber from the finder in the course of photographing, the quantity of light incident upon the photosensitive element from the leakage light rays from the eyepiece of the finder varies depending upon the difference of the reflector position. That is, whether prior to or during the course of exposure. However, in the present invention a fine correction circuit responding thereto is disposed in the photometric circuit to correct such errors.

DESCRIPTION OF THE PREFERRED EMBODIMENT

Figure 1:
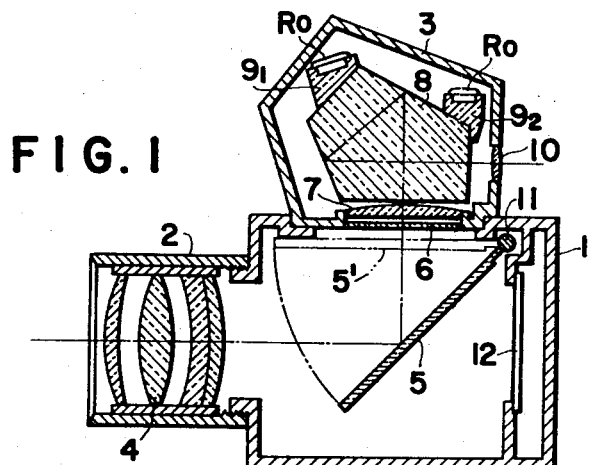
FIG. 1 is a longitudinal section view showing the formation of the essential portion of one embodiment of a photographic camera in accordance with the present invention.

FIG. 1 is a longitudinal section view of a single lens reflex camera which is one embodiment of the present invention. The photographic camera is composed of photographic chamber 1, lens barrel 2 which is detachably mounted to the front of photographic chamber 1, and finder 3 fixed to photographic chamber 1.

Light rays passing through objective lens 4 of lens barrel 1 and brought incident upon photographic chamber 1 are reflected at right angles by reflector 5 which is rotatable to the inclined position of 45° shown by the full lines in FIG. 1 and the horizontal position shown by the broken lines by means of turning shaft 11 when reflector 5 is located in the position shown by the full lines prior to exposure. An image is formed on focusing glass 6 in finder 3 and is condensed by condenser lens 7 and projected into pentagonal prism 8. The image thereof is observed through eyepiece 10 at the rear of finder 3. On the plane of pentagonal prism 8 two photoconductive elements $R_o$ are disposed respectively as small prisms $9_1$, $9_2$ cemented in the positions where the light rays are not disturbed, to measure extensively the brightness of the image on focusing glass 6.

Into photoconductive element $R_o$, therefore, external light rays leaked from eyepiece 10 as well as object light rays passing through the objective leans are incident.

Next, just as the shutter button is depressed to put the camera in the photographic state, reflector 5 is rotated to the horizontal position 5' shown by the broken lines and photographic chamber 1 and finder 3 are thoroughly shut off from light rays, and only light rays passing through objective lens 4 are photographed on film 12 by opening of the shutter (not shown in FIG. 1) and the exposure is effected. At this time external light rays leaked from the eyepiece 10 are incident on photoconductive element $R_o$.

In the single lens reflex camera described above it is impossible to measure the light from an object in the course of exposure, therefore, in the photometry just prior to exposure the photometric value thereof is stored and the exposure control circuit is operated on the basis of the stored value to control the shutter speed. However, as described hereinbefore before exposure is effected photoconductive element $R_o$ has received external leakage light rays coming from eyepiece 10 as well as light rays passing through objective lens 4 so that the output stored by the storage device has an error therein.

Figure 2:
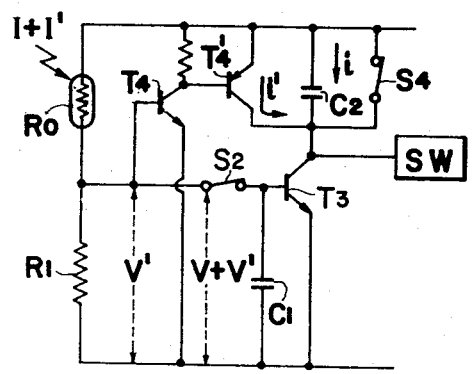
FIG. 2 is a diagram showing the fundamental formation of the electrical circuit of a photographic camera in accordance with the present invention.

In FIG. 2 showing the fundamental formation of the exposure control circuit provided with a correction circuit for compensating the aforesaid error, upon connecting photoconductive element $R_o$ and fixed resistance $R_1$ in series to an electric power source (not shown in the drawing), the electric potential at the junction thereof undergoes a change in accordance with the output of photoconductive element $R_o$, namely, in accordance with the intensity of illumination on the photosensitive plane of the photoconductive element, and is stored as a voltage by capacitor $C_1$ through closed switch $S_2$. Therefore, supposing the voltage at the junction is proportional to the intensity of illumination on the photosensitive plane, upon the photoconductive element $R_o$ light rays passing through the objective lens (suppose the intensity is I) and external light rays coming from the eyepiece (suppose the intensity is I') are incident, and the voltage $V + V'$ which is the output voltage V effected by the incident light of the intensity I plus the output voltage $V'$ effected by the incident light of the intensity I' is charged by capacitor $C_1$.

To the collector of transistor $T_3$, the base of which is connected to memory capacitor $C_1$, there are connected the exposure control circuit composed of timer capacitor $C_2$ and timing switch $S_4$ in parallel with capacitor 2, and the correction by-pass circuit composed of transistor $T_4$, in parallel with the exposure control circuit.

Assuming that the output current of transistor $T_3$ is proportional to the base voltage thereof, the collector current of $i + i'$ proportional to stored voltage $V + V'$ flows through transistor $T_3$.

Therefore, provided the correction by-pass circuit is not used, just as timing switch $S_4$ is opened simultaneously with the shutter opening, the timer capacitor is charged with the current $i + i'$. When the predetermined voltage is attained switching circuit SW is operated and the shutter is closed by an electromagnet to terminate the exposure. However, the timer capacitor must be charged with the intensity $i$ of the current in accordance with the brightness of an object, charging the timer capacitor with the intensity $i + i'$ results in errors in the time as long as it is charged to the predetermined voltage. If the current $i'$ resulting in those errors is arranged to flow through a by-pass, the timer capacitor is charged only with the intensity $i$ of the current and switching circuit SW can be operated at the correct time to terminate the exposure.

Transistor $T'_4$ serves as the correction by-pass circuit and is controlled by the output of photoconductive element $R_o$ effected by the leakage light rays coming from the eyepiece of the finder during the exposure. That is, to the collector of transistor $T_{41}$, the base of which is connected to the series junction between photoconductive element $R_o$ and resistance $R_1$, the base of transistor $T'_4$ is connected, so that making use of the fact that the junction voltage in the course of photographying becomes $V'$, when the collector current of transistor $T'_4$ becomes $i'$ by means of transistors $T_{41}, T_{42}$, the current $i'$ flows through the by-pass circuit and the timer capacitor can be charged only with the current in accordance with the intensity of illumination on the photosensitive plane of the photoconductive element $R_o$, which is effected by object light rays passing through the objective lens.

Figure 3:
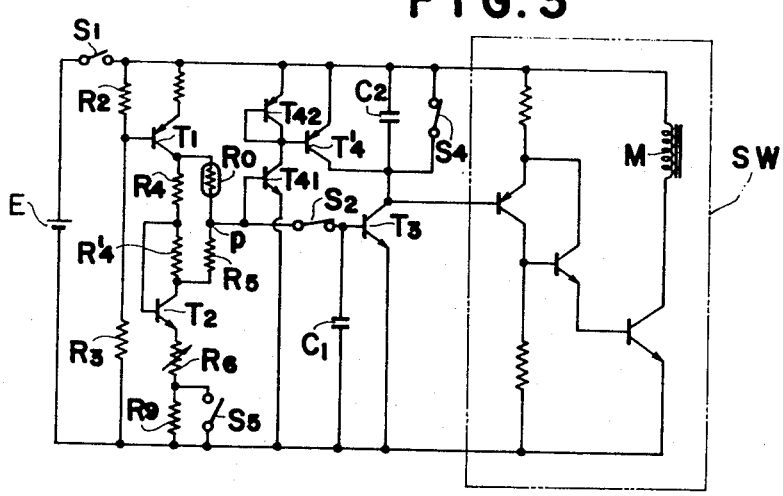
FIG. 3 is a diagram of the electrical circuit of one embodiment in accordance with the present invention.

In the above description some assumptions are made. For example, one embodiment carried into effect as a real electric control circuit is shown in FIG. 3. The circuit is fundamentally the same as the circuit shown in FIG. 2, so corresponding parts are denoted the same.

Resistances $R_2$, $R_3$ connected in series to electric power source E form a circuit for setting a fixed bias and the junction between resistances $R_2$, $R_3$ is connected to the base of transistor $T_1$ to form a constant-current circuit. To the collector of transistor $T_1$ in the constant-current circuit there are connected in series compound photoconductive element $R_o$ for measuring extensively the object image on the focusing glass and fixed resistance $R_5$. And a resistance composed of resistances $R_4$, $R_4'$ is connected in parallel with the compound photoconductive element $R_o$ and fixed resistance $R_5$ and also connected to the collector of transistor $T_2$. And, between the collector and base of transistor $T_2$ resistance $R_4'$ is connected, and to the emitter of transistor $T_2$ variable resistance $R_6$ and a short-circuit circuit having resistance $R_9$ and switch $S_5$ are connected in series. The resistance value of variable resistance $R_6$ is determined in accordance with the diaphragm setting and the sensitivity of the film used. Resistance $R_9$ and short-circuit switch $S_5$ will be described later.

The junction p between photoconductive element $R_o$ and resistance $R_5$ is connected to one end of storage capacitor $C_1$ via connecting switch $S_2$. And to the collector of transistor $T_3$, the base of which one end of memory capacitor $C_1$ is connected, timer capacitor $C_2$, timing switch $S_4$, and transistor $T'_4$ are connected in parallel with one another. Also to that collector there is connected switching circuit SW having electromagnet M for controlling the closing of the electromagnetic shutter.

Photoconductive element $R_o$ composed of said compound photoconductive elements has the characteristic for generating an output voltage proportional to the logarithmic value of the intensity of illumination on the photosensitive plane. On junction p, therefore, in storage capacitor $C_1$ a voltage proportional to the logarithmic value of the intensity of illumination on the photosensitive plane of compound photoconductive element $R_o$ is stored.

$$V + V' \sim \log(I + I')$$

Transistor $T_3$ generates the collector current for converting the base voltage to the inverse logarithm, so that collector current $i + i'$ thereof is proportional to the intensity of illumination $(I + I')$ on the photosensitive plane of the compound photoconductive element $R_o$.

And, in the correction circuit, the collector of transistor $T_{41}$, to the base of which node p is connected to transistor $T_{42}$ (corrected as a diode), and the logarithmically converted voltage is impressed between the base and the emitter of transistor $T'_4$ and transistor $T'_4$ produces an inverse logarithmic conversion to provide the by-pass for timer capacitor $C_2$.

The electric circuit is connected as described above, and before exposure is effected power switch $S_1$ is closed, connecting switch $S_2$ also is closed, and timing switch $S_4$ also is closed, so that the voltage is logarithmically compressed in accordance with the intensity of illumination $I + I'$ on the photosensitive plane of photoconductive element $R_o$, which is effected by object light rays passing through objective lens 4 and reflected by reflector 5 to focus on focusing glass 6 and light rays coming from eyepiece 10 are charged by capacitor $C_1$.

Just before the camera comes into the exposure attitude through the shutter release operation, connecting switch $S_2$ is opened and reflector 5 moves to the horizontal position 5' shown by broken lines, and upon photoconductive element $R_o$ only light rays coming from eyepiece 10 is incident and corresponding to the intensity of illumination $I'$ on the photosensitive plane the current $i'$ proportional thereto flow through transistor $T'_4$.

The output current $i + i'$ of transistor $T_3$ is inversely logarithmically converted to voltage $V + V'$ stored by the storage capacitor, and when timing switch $S_4$ is opened simultaneously with the opening of the shutter, capacitor $C_2$ is charged with the current proportional to the intensity of illumination $I$ on the photosensitive plane of photoconductive element $R_o$ effected by object light rays passing through the objective lens. Accordingly the correct exposure control in which errors owing to leakage light rays coming from eyepiece 10 are compensated can be carried into effect.

Besides, the position of movable reflector 5 is different depending upon whether the camera is coming into the exposure attitude or in the course of exposure, therefore, even though external leakage light rays coming into finder 2 from eyepiece 10 is invariable, the quantity of this light incident upon photoconductive element $R_o$ is variable. Resistance $R_9$ and short-circuited switch $S_5$ further correct the variance, and short-circuited switch $S_5$ is opened before the camera comes into the exposure attitude and opens simultaneously with the opening of connecting switch $S_2$ by which the camera is changed over to the exposure attitude, or simultaneously with opening of timing switch $S_4$ by which the exposure is started.

What is claimed is:

1. An automatic exposure control device for a photographic camera of the type having a photosensitive element mounted behind a focusing plate to receive light from a scene to be photographed through an objective lens, comprising:
   a light measuring circuit for generating an output signal as a function of the light intensity incident on said photosensitive element;
   means for storing said output signal;
   means for separating said means for storing from said light measuring circuit at least during the time period when said photosensitive element is blocked from said scene light;
   means for generating current in response to said stored output signal;
   means controlled by said current for timing shutter closing;
   a correction circuit responsive to said output signals for generating a current in accordance with the intensity of light incident on said photosensitive element unrelated to scene light to correct said means for timing;
   biasing means for additionally correcting said output signal in accordance with the unblocking or blocking of said photosensitive element; and
   switching means for deactuating said biasing means only during the blocking of said photosensitive element from scene light.

2. An automatic exposure control device as set forth in claim 1, wherein said photosensitive element includes two photoconductive elements and an output resistance connected in series with said photoconductive elements and wherein said output signal is a voltage proportional to the logarithm of said light intensity incident on said photoconductive elements, and said means for generating current and said correction circuit respectively include means for generating output current proportional to the antilogarithm of said voltage applied thereto.

3. An automatic exposure control device as set forth in claim 1, wherein said switching means is a switch connected across said biasing means, said switch being closed with said photosensitive element being blocked from scene light.

4. In a single lens reflex camera including a mirror movable between a viewing position and a photographing position and a photosensitive element mounted behind a focusing plate to receive light from a scene to be photographed through an objective lens and illuminated with stray light from an eyepiece with said mirror in said viewing position and said photographing position and blocked from said scene light with said mirror in photographic position, an automatic exposure control device comprising:
   a light measuring circuit including said photosensitive element for generating an output voltage in accordance with the light intensity incident on said photosensitive element;
   means for storing said output voltage;
   means for separating said means for storing from said light measuring circuit at least during the time period when said photosensitive element is blocked from said scene light;
   means responsive to said stored voltage for generating current proportional to the light intensity incident on said photosensitive element;
   an integrating capacitor charged by said current;

means for actuating shutter closing in response to the voltage of said integrating capacitor;

a correction circuit having an output circuit connected across said integrating capacitor and an input terminal for constantly receiving said output voltage generated by said stray light;

biasing means for additionally correcting said output voltage; and means for actuating said biasing means with said mirror in said viewing position and during movement of said mirror to said photographing position and deactuating said biasing means with said mirror in said photographing position.

5. An automatic exposure control device as in claim 4, wherein said biasing means is a resistor and said means for actuating and deactuating is a switch short-circuiting said resistor to deactuate the same.

6. An automatic exposure control device as in claim 4, wherein said means for actuating and deactuating is a switch across said biasing means, said switch being open with said mirror in said viewing position.

7. An automatic exposure control device as in claim 6, further comprising a focusing plate and a pentagonal prism on which said photosensitive element is mounted to receive light from said focusing plate.

8. In a single lens reflex camera including a mirror movable between a viewing position and a photographing position and a photosensitive element receiving light from a scene to be photographed through an objective lens and illuminated with stray light from an eyepiece with said mirror in said viewing position and blocked from said scene light with said mirror in photographic position, an automatic exposure control device comprising:

first means including said photosensitive element for generating a first voltage varying proportional to the logarithm of the scene brightness;

second means for generating a second voltage representative of diaphragm aperture and film sensitivity settings;

means for generating an output voltage proportional to the logarithm of exposure time said first and second voltage;

to the logarithm of exposure time in accordance with said first and second voltage;

means for storing at least said first voltage;

means for separating said means for storing from at least said first means at least during the time period when said photosensitive element is blocked from said scene light;

means responsive to said output voltage for generating current proportional to the anti-logarithm of said output voltage;

an integrating capacitor charged by said current;

means for actuating shutter closing in response to the voltage of said integrating capacitor; and a correction circuit having an output circuit connected across said integrating capacitor and an input terminal for constantly receiving said output voltage, whereby when said photosensitive element is blocked from the scene light, said current is also controlled by said output voltage generated by said stray light.

9. An automatic exposure control device as in claim 8, further comprising biasing means for additionally correcting said output voltage, and means for actuating said biasing means with said mirror in said viewing position and during movement of said mirror to said photographic position and deactuating said biasing means with said mirror in said photographic position.

10. An automatic exposure control device as in claim 9, wherein said biasing means is a resistor and said means for actuating and deactuating is a switch in parallel with said resistor.

11. An automatic exposure control device as in claim 10, wherein said switch is closed with said mirror in said photographic position.

* * * * *